Nov. 15, 1966 K. STEINBUCH ETAL 3,286,238

LEARNING MATRIX FOR ANALOG SIGNALS

Filed Nov. 28, 1962 3 Sheets-Sheet 1

INVENTORS.
KARL STEINBUCH
BY PETER MÜLLER
Percy P. Lantzy
ATTORNEY

LEARNING MATRIX FOR ANALOG SIGNALS

Filed Nov. 28, 1962 3 Sheets-Sheet 2

INVENTORS.
KARL STEINBUCH
PETER MÜLLER
BY
ATTORNEY

LEARNING MATRIX FOR ANALOG SIGNALS

Filed Nov. 28, 1962 3 Sheets-Sheet 3

INVENTORS.
KARL STEINBUCH
PETER MÜLLER
BY Percy P. Lantzy
ATTORNEY

United States Patent Office 3,286,238
Patented Nov. 15, 1966

3,286,238

LEARNING MATRIX FOR ANALOG SIGNALS

Karl Steinbuch, Ettlingen, Baden, and Peter Müller, Karlsruhe, Germany, assignors to International Standard Electric Corporation, New York, N.Y., a corporation of Delaware Filed Nov. 28, 1962, Ser. No. 240,697
Claims priority, application Germany, Dec. 7, 1961, St 18,653
9 Claims. (Cl. 340—172.5)

The translator which is capable of learning and which has become known as the "learning matrix," is only suitable for processing binary (or digital) signals, or sets of binary signals which are assigned to certain properties respectively. In many cases the sets of signals assigned to certain properties, however, appear in an analog form, that is, the amplitudes of the signals may assume other arbitrary values. A translator circuit which is capable of assigning such sets of signals to a certain class of meanings, may be referred to as a perception circuit. If the translator is of a matrix-shaped design, i.e. when to each set of signals or to each pattern there is assigned one row of the matrix, this circuit may also be referred to as a learning matrix for analog signals. In this case electrical connections are established at the intersecting points, with the conductances corresponding to the patterns, e.g. by soldering fixed resistors, or the like therein. These types of translators have become known above all for the purpose of performing character-recognition methods.

In addition to these conventional types of translator circuits, the present invention is aimed at providing a circuit arrangement by which the conductances are only established by the offered patterns themselves.

Figure 1:
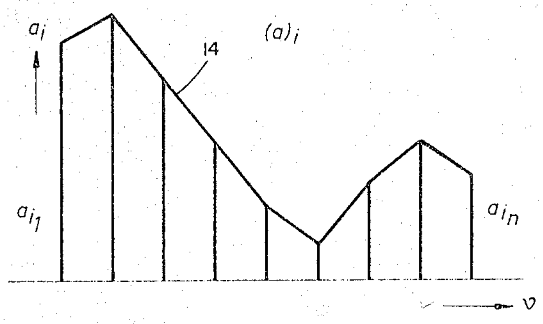

A pattern with the current number $i$ is represented by a generally finite sequence of scalar quantities or features (see FIG. 1).

$$\{a\}_i=\{a_{i1};\ a_{i2}\ .\ .\ .\ a_{i\nu}\ .\ .\ .\ a_{in}\} \qquad (1)$$

The features $a_{i\nu}$ of the pattern or set of signals $\{a\}_i$ may thereby assume arbitrary magnitudes. However, it is necessary that the patterns are standardized, in other words, that all of the patterns have the same energy:

$$\sum_{\nu=1}^{n} a_{i\nu}^2=P^2=\text{const};\ i=1,\ 2,\ .\ .\ .\ m \qquad (2)$$

Where P represents any pattern and $P^2$ is a constant.

The learning matrix for analog signals is a matrix-type circuit structure having the characterizing property that upon feeding a pattern $\{a\}_i$ into the columns of the arrangement, one row assigned to the pattern $\{a\}_i$ will be subjected to a maximum excitation, and will indicate a meaning or significance $b_i$. The arrangement is made in such a way that $n$ columns, corresponding to the number $\nu$ of the features $a_{i\nu}$ of the offered pattern $\{a\}_i$, and $m$ rows, the significance lines for the meanings $b_i$, form a matrix-type of structure 6 according to FIG. 2. At the points of intersection between the columns $$A_1\ .\ .\ .\ A_\nu\ .\ .\ .\ A_n$$

and the rows $B_1\ .\ .\ .\ B_\nu\ .\ .\ .\ B_m$ there are inserted two-terminal networks 7, hereinafter referred to as connecting elements $g_{i\nu}$, the defined behaviour of which enabling the maximum excitation of row $B_i$ assigned to the offered pattern $\{a\}_i$.

All the rows 8 are assembled in a so-called maximum detection circuit 9. It is the object of this maximum detection circuit to indicate the row having a maximum excitation, namely the row $B_i$.

The maximum excitation of the $i$th row is given by $$\theta_i=\sum_{\nu=1}^{n} a_{i\nu}g_{i\nu}i=1,\ 2,\ .\ .\ .\ m \qquad (3)$$

The pattern $\{a\}_i$ with the amplitudes $$a_{i1}\ .\ .\ .\ a_{i\nu}\ .\ .\ .\ a_{in}$$

may be described by a vector within the $n$-dimensional vector space with the components $a_{i1}\ .\ .\ .\ a_{i\nu}\ .\ .\ .\ a_{in}$. The magnitude of this vector is $$|\{a\}_i|=\sqrt{\sum_{\nu=1}^{n} a_{i\nu}^2}$$

or, in accordance with Equation 2

$$|\{a\}_i|=P \qquad (4)$$

With respect to each pattern $\{a\}_i$ it is possible to state a unit vector $v_i$ in the same direction as $a_i$ and the magnitude 1:

$$v_i=\{a\}_i/P \qquad (5)$$

In the n-dimensional vector space there exist a number of $m$ patterns $\{a\}_i^o$ with the direction of the unit vectors $v_i$, hereinafter referred to as "unit pattern."

A pattern $\{a\}_k$ offered to the perception matrix, together with a unit pattern $\{a\}_i^o$, forms the angle $\varphi_{i,\,k}$, which may be stated by the scalar product of both vectors:

$$\varphi_{i,k}=\text{arc cos}\ \frac{\{a\}_k\cdot\{a\}_i^o}{|\{a\}_k|\cdot|\{a\}_i^o|};\ i=1,\ 2,\ .\ .\ .\ m \qquad (6)$$

The scalar product reaches a maximum with respect to that particular pattern $\{a\}_k$ which, with $\{a\}_i^o$, includes the smallest angle $\varphi_{i,\,k}$. In cases where $\varphi_{i,\,k}=0$, $\{a\}_k$ is identical to the unit pattern $\{a\}_i^o$.

With a view of technically realizing the problem, it is self-suggesting to form an expression $$\theta_i=k\sum_{\nu=1}^{n} a_{i\nu}^o a_{k\nu};\ i=1,\ 2,\ .\ .\ .\ m \qquad (7)$$

corresponding to the scalar product to be used as row marking. This is accomplished by using conductances $G_{i\nu}$ as connecting elements, in the course of which, and unlike the binary-operated learning matrices, the conductances will assume arbitrary values which are merely restricted by a condition which is still to be formulated.

The conductances are adjusted in such a way that $$G_{i\nu}=ka_{i\nu}^o \qquad (8)$$

According to Equation 2 the restriction with respect to the magnitudes of the conductances reads as follows:

$$G_{i\nu}^2=K^2=const;\ i=1,\ 2,\ .\ .\ .\ m;\ \nu=1,\ 2,\ .\ .\ .\ n \qquad (9)$$

Where the standard conductance $G_{i\nu}$ is designated as K and $K^2$ is a constant.

When representing the features of an offered pattern $a_{\nu k}$ by sources of voltage of low internal resistance with the voltage $a_{k\nu}$ volts, then the excitation of the $i$th row is a current $$I_i=\sum_{\nu=1}^{n} a_{k\nu}G_{i\nu}=k\sum_{\nu=1}^{n} a_{k\nu}a_{i\nu}^o;\ i=1,\ 2,\ .\ .\ .\ m \qquad (10)$$

This Equation 10, however, is the term as postulated in Equation 7.

Since negative conductances are incapable of being realized, only features with magnitudes $a_{i\nu}\geqq 0$ would be admitted in accordance with Equation 8. This restriction, however, is avoided by the following arrangement (see FIG. 3).

With respect to each feature there are provided two "contrary" columns 10 and 12 in such a way that $+a_{i\nu}$ is applied to the first column 10, and $-a_{i\nu}$ is applied to the second column 12. Equation 8 is then analogously extended to the following condition:

$$G_{i\nu}=ka_{i\nu}^{o};\ \overline{G}_{i\nu}=0 \text{ for } a_{i\nu}\geqq 0$$
$$G_{i\nu}=0;\ \overline{G}_{i\nu}=ka_{i\nu}^{o} \text{ for } a_{i\nu}\leqq 0 \quad (11)$$

On account of this, arbitrary features are admitted which, however, as a unit pattern, will have to satisfy Equation 2.

There will now follow a more detailed description of the most substantial property of the learning matrix for analog signals, namely the amplitude-invariant recognition of patterns.

By multiplying all features $a_{k\nu}$ of a pattern $\{a\}_k$ with the constant factor L there is produced a new pattern $\{a\}_k'$, with the following being applicable in a vectorial notation:

$$\{a\}_k'=L.\{a\}_k \quad (12)$$

wherein $\{a\}_k'$ is an affine transformation of the pattern $\{a\}_k$ with respect to the axis of reference of the pattern $\{a\}_k$.

The learning matrix for analog signals is capable of performing the recognition of affinely transformed patterns, as may be taken from a consideration of Equation 6: It is assumed that there is offered the pattern $\{a\}_k'$ resulting from affine transformation from $\{a\}_k$. In this case Equation 6 will read as follows:

$$\varphi_{i,k}=\text{arc cos}\frac{\{a\}_k'\cdot\{a\}_i^{o}}{|L\{a\}_k|\cdot|\{a\}_i^{o}|};\ i=1, 2, \ldots m$$

Again the scalar product reaches a maximum with respect to that particular pattern $\{a\}_k$ which, together with $\{a\}_i^o$, forms the smallest angle $\varphi_{i,k}$. In the matrix circuit there will then be effected a maximum excitation of the pattern $\{a\}_i^o$ bearing the greatest resemblance to $\{a\}_k$, and assigned to row $B_i$, and by the maximum detection circuit there is indicated the meaning $b_i$. Incidentally, by the learning matrix for analog signals there is allocated to the pattern $\{a\}_k$ which has been affinely transformed from $\{a\}_k'$, the meaning $b_k$ assigned to the pattern $\{a\}_k$.

In solving the given problem, namely of designing the learning matrix for analog signals in a manner capable of learning, attention still has to be paid to the fact that the magnitude of a connecting element does not represent a measure of a more or less high reliability of the output information, as is the case with the binary learning matrix, but represents a measure of magnitude of the respective feature $a_\nu$. The matrix process of learning one or more patterns may be designated as the "learning-in" or "learning phase." The pattern recognition phase may be considered as the "confirming phase" or "learned phase." When disregarding the complex type of connecting elements, it will result that a "learning-in" is only possible in one step. Irrespectively of this a once learned pattern may be either completely or partly "re-learned," in other words, corrected later on.

Accordingly, the present invention relates to an electric circuit arrangement for identifying one pattern out of a plurality of $m$ patterns which are represented by a number of $n$ features characterised by analog electric signals.

According to the invention the input and output leads are arranged in a matrix shape, to each row 8 there is allotted a previously determinable meaning, and connecting elements 7 are arranged at the intersecting points being first of all independent of the patterns, and only being formed by the patterns themselves for the purpose of recognizing the latter, in that all of the $m$ patterns are stored in a row-wise fashion into the $m$ rows of the matrix circuit comprising $n$ columns 10, in a way that the connecting elements, by action of the column-and-row control, are changed or varied in such a way that their connecting effect will become proportional to the features of the respective patterns.

Accordingly, the general idea of the invention consists in determining the magnitudes of the physical quantity characterising the connecting elements of one line of the learning matrix for analog signals, and of comparing them with the magnitudes of the physical quantities characterizing the features of the pattern to be "learned" into the respective row, with this comparison being performed, if necessary, after the physical quantities have been converted into comparable quantities. From the difference between both quantities there is derived a third quantity acting upon the connecting elements of this row only, i.e. in a way that the difference between both magnitudes will always become smaller and will finally approach the value zero.

The physical design of the connecting elements may be chosen at will; the properties thereof merely have to be reversible within certain limits. Thus, it is possible to use as connecting elements ferrite cores having a rectangular hysteresis loop, ribbon cores, metallized paper-, metal foil-, or evaporation-capacitors.

When using toroidal ferrite cores as connecting elements, it is appropriate to pass two column wires and one row wire through each toroidal core; the interrogation as regards the respective state (or condition) of the toroidal cores is then effected with the aid of a high-frequency alternating current supplied to the respective row, and which induces a voltage in that particular type of column wires whose amplitude and phase characterises or identifies the state of induction of the toroidal cores, which is then compared with the alternating voltages characteristic of the features to be "learned." The difference current resulting from the comparison is used, together with the row or line current, for changing the state of the connecting elements.

Figure 2:
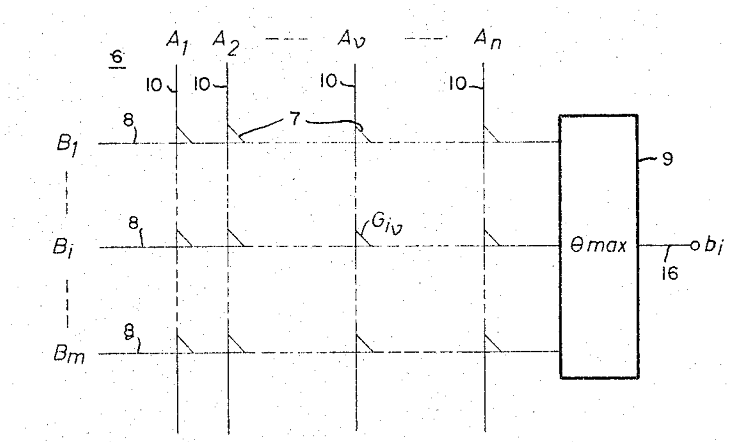
Figure 3:
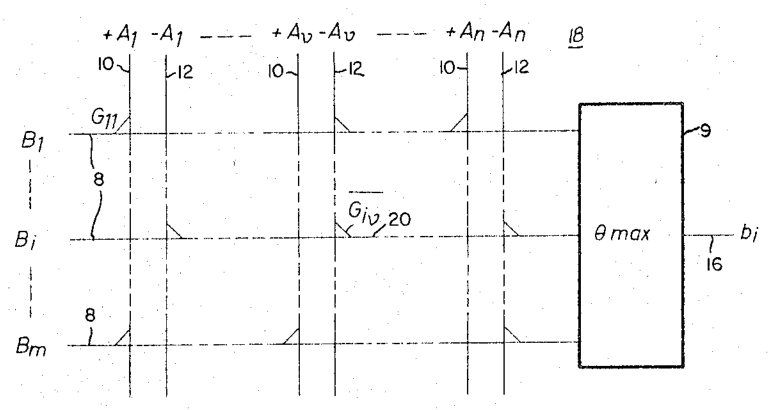
Figure 5:
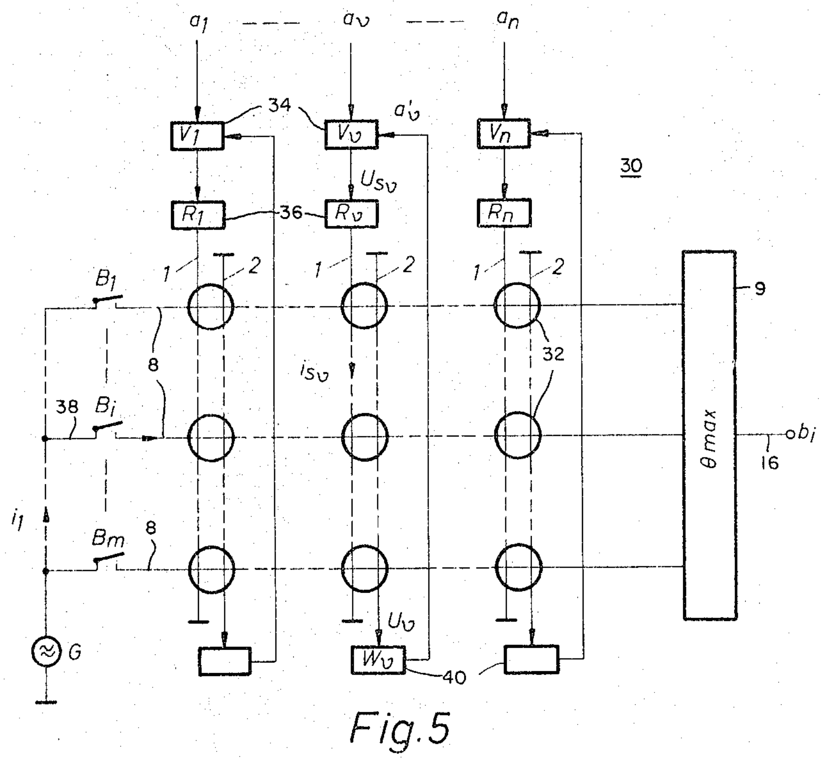
Figure 4:
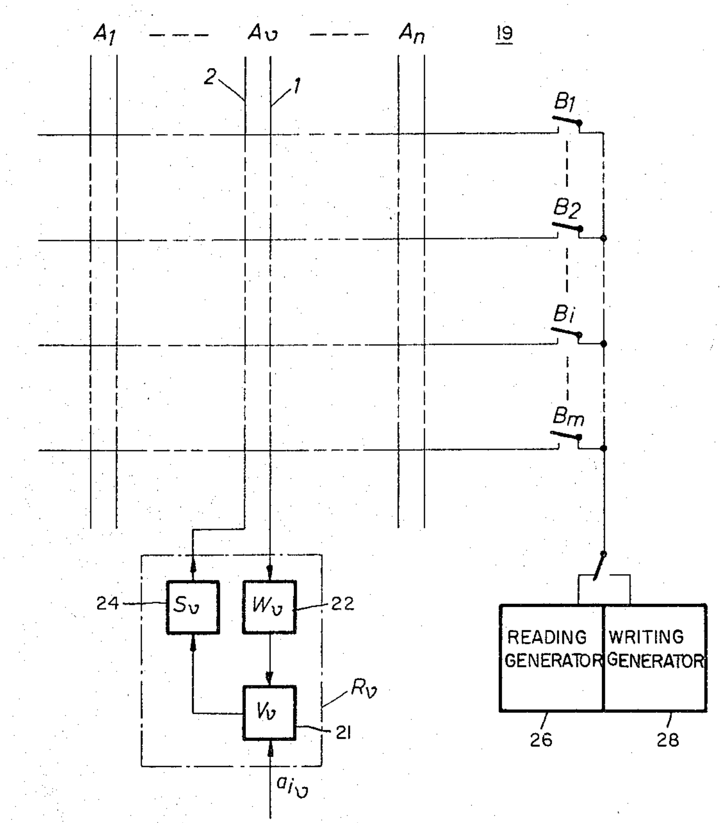

In the following the invention will now be explained in detail with reference to examples of embodiment shown in FIGS. 1–5 of the accompanying draws, in which:

FIG. 1 is the graphical representation of a pattern $\{a\}_i$ with discreet amplitudes $a_{i\nu}$, FIG. 2 shows a static type of learning matrix for analog signals, FIG. 3 shows a static type of learning matrix for evaluating patterns having both positive and negative features (amplitudes), FIG. 4 is a schematic representation serving to illustrate the control processes of the inventive type of matrix which is capable of learning, and FIG. 5 shows an inventive type of matrix capable of learning.

FIG. 1 shows an arbitrary pattern 14 $\{a\}_i$ with a number of $n$ arbitrary amplitudes $a_{i\nu}$. In order to recognize such a pattern, in other words, to assign it to a certain class of meaning, there may be used the matrix circuit 6 as shown in FIG. 2; in this case there is assigned to each amplitude $a_{i\nu}$ one column 10, $A_\nu$, and each time one pattern is assembled in one row 8, $B_i$, in that conductances 7, $G_{i\nu}$ are arranged at the intersecting points in accordance with the respective amplitude $a_{i\nu}$. Upon feeding-in a pattern contained in the matrix circuit, there is then ascertained the row 8 as assigned to the respective pattern, with the aid of the maximum detection circuit 9, $\theta_{max}$, whereupon the corresponding class of meaning may be taken from the output 16, $b_i$.

The learning matrix 18 shown in FIG. 3 differs from the matrix 6 shown in FIG. 2 in that for each amplitude $a_{i\nu}$ there are provided two columns 10, $+A_\nu$ and 12, $-A_\nu$. A matrix of this type can be used in cases where the pattern $\{a\}_i$ has positive as well as negative amplitudes $a_{i\nu}$. To the column 10, $+A_\nu$ there are then applied the amplitudes $+a_{i\nu}$, and to the column 12, $-A_\nu$ there are applied the amplitudes $-a_{i\nu}$, e.g. by employing a reversing amplifier. In a corresponding way there will be obtained at both columns the admittances 7, $G_{i\nu}$ and 20, $\overline{G}_{j\nu}$. The pattern $\{a\}_i$ is again determined via the maximum detection circuit 9.

FIG. 4 shows the basic construction of a matrix 19 for analog signals which is capable of learning, without the connecting elements having been designated in detail at the intersecting points. Each column contains a comparator 21, $V_\nu$ to which, from the one side, there is fed the amplitude $a_{i\nu}$ and, from the other side, the actual value as taken from the controlled intersecting point of this column. This actual value still has to be converted in the converter 22, $W_\nu$ in such a way that there will result two comparable electrical quantities, the difference between which is then constituted in the comparator 21, $V_\nu$. Via the writing generator 24 $S_\nu$, the difference value is then again written (stored) into the column. For marking the controlled row there is provided the reading generator 26 or the writing generator 28 respectively. Accordingly, upon reading-out the actual value, the reading generator 26 is connected to the respective row *i*, and for effecting the writing-in of the difference value is constituted in the comparator 21, $V_\nu$; the writing generator 28 is then connected to this particular row. Instead of the reading generator 26 and the writing generator 28 there may also be used a common generator.

FIG. 5 shows a matrix 30 which is capable of learning, and in which ferrite cores 32 or ribbon cores are used as connecting elements. Prior to the learning process, the toroidal or ring cores 32 are in any state of induction. The features $a_{i\nu}$ of the pattern $\{a\}_i$ to be learned-in, are represented by alternating voltages of a high frequency with an amplitude of $a_{i\nu}$ volts, and the frequency $\omega$ is represented by alternating voltages $a_{i\nu}$ cos $\omega t$, applied to the comparator circuits 34, $V_\nu$ which are connected to the column wires 1 via a controller 36, $R_\nu$. Relative thereto it is assumed that the signals are standardized in the manner as already explained hereinbefore. By closing the switch 38, $B_i$ there is prepared the process of learning a pattern $\{a\}_i$ into the *i*th row. In other words, there is effected the assignment of the class of meaning $b_i$. Subsequently to the closing of switch 38, $B_i$ a high-frequency alternating current of the generator will be flowing in the *i*th rows, with the amplitude $\hat{\imath}_1$ and the frequency $\omega/2$, that is, with half the generator will be flowing in the *i*th row, with the features. The shape of the curve as a function of time of this alternating current is described by:

$$i_1=\hat{\imath}_1 \sin \frac{\omega}{2} t \tag{13}$$

Its amplitude $\hat{\imath}_1$ is to be chosen thus that at the given frequency $\omega/2$ the state of induction of the cores of the *i*th row is only changed in a reversible way. In other words, the cores are read in a non-destructive way. The high-frequency alternating current induces in the column wires 2 an alternating voltage $U_\nu$ which, due to the non-linear $\phi$ vs. *i*-characteristic of the ring cores, contains a voltage component with double the frequency of the exciting alternating current $i_1$, hence the frequency $\omega$ (first upper harmonic). Both the amplitudes and the phases of these harmonic frequencies are dependent upon the magnetic state of the ring cores which, at first, may be at random. In the converter 40, $W_\nu$ the harmonic frequencies are filtered out of the alternating voltages $U_\nu$, amplified, and phase-shifted by 270°. The outputs of the transducers or converters 40, $W_\nu$ are thus alternating voltages having an amplitude $a_{i\nu}'$ and the frequency $\omega$, hence are alternating voltages of the form $a_{i\nu}'$ cos $\omega t$. These alternating voltages are likewise fed to the comparators 34, $V_\nu$ which now form difference voltages $U_{s\nu}$ from the applied alternating voltages $a_{i\nu}$ cos $\omega t$ and $a_{i\nu}'$ cos $\omega t$:

$$U_{s\nu}=(a_{i\nu}-a_{i\nu}') \cos \omega t \tag{14}$$

The difference voltages $U_{s\nu}$ can be obtained in the same way if, in the transducers or converters 40, $W_\nu$, the harmonic frequencies are not phase-shifted by 270°, but by 90°, and if the comparator 34, $V_\nu$ does not form the difference, but the sum of the alternating voltages $a_{i\nu}$ cos $\omega t$ and $a_{i\nu}'$ cos $\omega t$ applied thereto.

In the controllers 36, $R_\nu$, the difference voltages $U_{s\nu}$ are converted to alternating currents $i_{s\nu}$ in a manner particularly described hereinafter:

$$i_{s\nu}=C(a_{i\nu}-a_{i\nu}') \cos \omega t=\hat{\imath}_{s\nu} \cos \omega t \tag{15}$$

Accordingly, two alternating currents $i_{s\nu}$ cos $\omega t$ and $$i_1 \sin \frac{\omega}{2} t$$

act upon the cores of the *i*th row selected by the closing of the switch $B_i$. Both currents have a frequency ratio of 2:1 and are phase-shifted by 90° in relation to one another, because the current $i_1$ is described by a sin-function, and the current $i_{s\nu}$ is described by a cos-function.

It is demanded that during the learning phase of the inventive arrangement only the cores 32 of the selected row 8 are supposed to be irreversibly changed by the learning method. This requirement is satisfied by a coincidence operation, that is, by a coincidence of the high-frequency currents $i_1$ and $i_{s\nu}$. None of the high-frequency currents may cause for itself any independent irreversible changes of induction in the cores 32. This condition has already been mentioned in connection with the reading current $i_1$ flowing in the *i*th row (non-destructive reading method); this is likewise applicable to the column currents $i_{s\nu}$, in order to prevent the cores which may be associated with the $\nu$th column, but not with the selected *i*th row, from being subjected to irreversible changes of induction. Accordingly, it is to be demanded that:

$$\hat{\imath}_1=\hat{\imath}_{m1} \text{ and } \hat{\imath}_{s\nu}=\hat{\imath}_{m2} \tag{16}$$

wherein $\hat{\imath}_{m1}$ or $\hat{\imath}_{m2}$ respectively are the maximum admissible current amplitudes at the frequencies $\omega/2$ or $\omega$ respectively, at which there are not yet caused any irreversible induction changes in the cores 32 traversed by the currents $i_1$ or $i_{s\nu}$ respectively.

Changes of induction in the cores of the *i*th row are only caused when both of the high-frequency currents $i_1$ and $i_{s\nu}$ cooperate.

Methods of storing (writing) binary information into the cores of a ferro-magnetic matrix circuit by the coincidence of two high-frequency currents of different frequency and phase are already known (German Patent No. 1,023,486). In the course of this, and quite depending on the binary information "1" or "0" to be stored, the cores are brought into either the positive or the negative state of saturation remanence. Up to now, however, it has been impossible to store analog information items in such types of matrix circuits with the aid of the said method.

With the aid of the inventive method, however, it is possible to adjust the cores to any induction values ranging from the values of the negative to those of the positive state of saturation remanence. For giving a detailed explanation of this, however, it is necessary to closely examine the magnetizing process in one individual core of the *i*th row forming part of the entire matrix arrangement.

The core is transversed by the high-frequency currents $i_1$ and $i_{s\nu}$ which produce a common magnetic field H(*t*):

$$H(t)=k\left(i_1 \sin \frac{\omega}{2}t+i_{s\nu} \cos \omega t\right) \tag{17}$$

The association between the magnetic field H(*t*) and the induction B(*t*) is non-linear (hysteresis loop); it may be approximated by the following proper series:

$$B(t)=a_1H(t)a_3H^3(t)+\ .\ .\ . \tag{18}$$

The irreversible change of induction *d*B occurring after each period of the magnetic field-intensity oscillation H(*t*), results from $$dB=\int_0^{\pi/\omega} B(t)\,dt=\frac{3}{4}\frac{\pi}{\omega}k^3a_3i_1{}^2i_{s\nu} \tag{19}$$

so that the states of induction $$B = n\frac{3\pi}{4\omega}k^3 a_3 i_1^2 i_{s\nu}$$

will occur after $n$ periods, that is, after $2n/\omega$ seconds.

During the learning process the features $a_{1\nu}$ cos $\omega t$ which are to be learned, are continuously compared in the comparator circuits with the features $a_{i\nu}'$ cos $\omega t$ as already stored in the cores. Due to the irreversible (permanent) induction changes of the cores of the $i$th row, caused by the coincidence of the two high-frequency currents $i_1$ *and* $i_{s\nu}$, there is effected a reduction of the difference between the features to be learned and the features already learned after the preceding changes of induction and, consequently (according to Equation 15), also the high-frequency column current $i_{s\nu}$ coinciding with $i_1$. The controllers 36 $R_\nu$ are amplifier stages of the conventional type producing the output currents $i_{s\nu}$ which are in proportion to their input voltages $U_{s\nu}$, viz. the column currents. In cases where $$a_{1\nu} \cos \omega t = a_{1\nu}' \cos \omega t \qquad (20)$$

that is, where the features to be learned are in agreement with the already learned features, the column current $i_{s\nu}$ will become zero and, consequently, also the change of induction $d$B, in other words: there are not performed any further irreversible changes of induction, and the reached state of induction of the cores is maintained.

If, therefore, in a subsequently following recognizing, "confirming" or "learned" phase there is performed an interrogation of the ring cores of the $i$th row, then, in an interrogating winding which, in the learned or confirming phase, is the row wire 8, each ring core 32 will induce an output voltage whose first upper harmonic is just in proportion to the alternating voltage representing the respective feature of the previously learned patterns.

In the described learning matrix 30 for analog signals which is capable of learning, and which is shown in FIG. 5, it was assumed that the magnetic state of the ring cores 32 which, prior to the learning process, was assumed to be at random, is brought into the final condition, in other words: that e.g. a previously learned pattern is replaced by a new pattern. The learning-in, however, may also be controlled in such a way that the previously learned pattern is only partly re-learned, i.e. corrected. To this end it is merely necessary to let a defined number of oscillations of the high-frequency column current $i_{s\nu}$ coincide with the high-frequency row current $i_1$. The number of coinciding current oscillations is in proportion to the statistic weight of the features to be corrected.

The circuit arrangement according to FIG. 5 can be modified in such a way that the ring cores 32 of one column are only traversed by one column wire. In this column wire there will then flow the column current $i_{s\nu}$ cos $\omega t$. The voltage component $U_\nu'$ sin $\omega t$ as produced by the line current $$i_1 \sin \frac{\omega}{2} t$$

and contained in the output voltage, likewise appears in the column wire. Between both of them there is a phase difference of 90°. The alternating voltage $U_\nu'$ sin $\omega t$ may be separated from the column current $i_{s\nu}$ cos $\omega t$ with the aid of a phase filter or by applying a ring modulation.

While we have described above the principles of our invention in connection with specific apparatus, it is to be clearly understood that this description is made only by way of example and not as a limitation to the scope of our invention as set forth in the objects thereof and in the accompanying claims.

What we claim is:

1. An arrangement for learning and identifying a plurality of electric analog signal patterns comprising an $m$ x $n$ matrix of two or more $m$ rows and one or more $n$ columns of conductors having input and output leads connected to each row and column, connecting elements arranged at the intersecting points of row and column conductors, control means for selectively switching analog and control signals to row and column conductors and maximum detection circuit means whereby during a learning phase each of a plurality of analog signal patterns applied to the one or more columns causes the physical condition of one rows connecting elements to be changed by the action of a column and row control in the course of one or more steps so that the connecting effect of the connecting elements becomes proportional to the features of the respective patterns so that each row represents the class of one pattern out of a number of $m$ patterns and that during the confirming or learned phase, with the aid of the maximum detection circuit, the application of an unknown pattern to column leads will generate an output signal indicative of the row ($i$) having the row pattern most nearly like the applied unknown pattern.

2. An arrangement according to claim 1, characterized in this, that during the learning phase the connecting elements of that particular row ($i$) into which the pattern is supposed to be learned, is interrogated with respect to its physical condition, and that the actual value as formed therefrom, is compared with the standardized required magnitude as given by the pattern, and that the said connecting elements arranged at the intersecting points, are in such a way acted upon by the control quantity as formed thereby, that the setting quantity as formed out of the control quantity is stored into the said connecting elements of the associated and simultaneously marked row, and that the thus varied or changed connecting elements are again interrogated for forming a new control quantity, with these processes being continued until the control quantity proceeds towards zero, or has reached the predetermined final value respectively.

3. An arrangement according to claim 1, characterized in this, that ferro-magnetic arrangements, such as ferrite cores are used as connecting elements.

4. An arrangement according to claim 3, characterised in this, that each toroidal or ring core is traversed by two column wires and one row wire, and that the interrogation of the respective state of the said connecting elements of a row is effected with the aid of an alternating current by connecting a high frequency generator to the row wire of the respective row via the secondary column wires (2), the induced voltages of which being compared to the alternating voltages which are in proportion to the features to be learned, and that the difference current resulting from the said comparison, together with the row current, is used for changing the condition of said connecting elements.

5. An arrangement according to claim 4, characterised by comparators ($V_1 \ldots V_\nu \ldots V_n$), to which the patterns $\{a\}_1$ with the features represented by alternating voltages ($a_{1\nu}$.cos $\omega t$) are fed during the learning phase as well as during the learned or confirming phase, as well as by a high-frequency generator (G), and row switches ($B_i$) which are connected to the row wires, by the closing of which an alternating current $$\left(i_1 = i_1 \cdot \sin \frac{\omega}{2} t\right)$$

is fed into the respective row ($i$), with the said alternating current, in turn, inducing in the column wires (2) an alternating voltage ($U_\nu$) having the frequency ($\omega$), further characterised by converters or transducers ($W_1 \ldots W_\nu \ldots W_n$) with the aid of which the harmonic frequencies are filtered out, amplified, and phase-shifted by 270°, with the output voltages thereof ($a_{i\nu}'$.cos $\omega t$) being fed to the comparators ($V_1 \ldots V_\nu \ldots V_n$) aimed at forming the difference voltages ($U_{s\nu} = (a_{i\nu} - a_{i\nu}')$.cos $\omega t$) which are converted in the controllers ($R_1 \ldots R_\nu \ldots R_n$) to alternating currents ($i_{s_\nu}=\hat{\imath}_{s_\nu}.\cos \omega t$), so that the currents ($i_{s_\nu}.\cos \omega t$) and $$\left(i_1 \cdot \sin \frac{\omega}{2} \cdot t\right)$$

will act upon the cores of the $i$th row and cause an irreversible change of the cores during the learning phase, until ($a_{i_\nu}.\cos \omega t = a_{i_\nu}' \cos \omega t$).

6. An arrangement according to claim 1, characterised in this, that as connecting elements there are used metallized-paper, metal-foil or evaporation capacitors (dielectric and metal coating evaporated).

7. An arrangement according to claim 1 characterised in this, that tantalum capacitors formed by a non-conducting covering layer within a tantalum electrolytic arrangement are used as connecting elements.

8. An arrangement according to claim 1, characterised in this, that by the use of double columns supplied by the same alternating voltages representing the features of the pattern to be learned, but with a phase relation opposite to that of the alternating voltages, there is achieved a reversibility of the connecting elements within certain limits.

9. A multi-level control circuit arrangement, characterised in this, that the arrangement comprises a magnetic core having a substantially square loop hysteresis characteristic, two control windings coupled to said core, a source of fixed control signals at a given frequency, connected to one of said control windings, a source of variable control signals at twice said given frequency, signal pick-up means tuned to twice said given frequency coupled to said core, means for comparing the output of said signal pick-up means with said variable control signals, and means for applying the output of said comparing means to the other of said control windings.

References Cited by the Examiner

UNITED STATES PATENTS

| | | | |
|---|---|---|---|
| 3,103,648 | 9/1963 | Hartmanis | 340—172.5 |
| 3,132,256 | 5/1964 | Giel | 307—88 |

ROBERT C. BAILEY, *Primary Examiner.*

R. B. ZACHE, *Assistant Examiner.*